Patented Jan. 27, 1925.

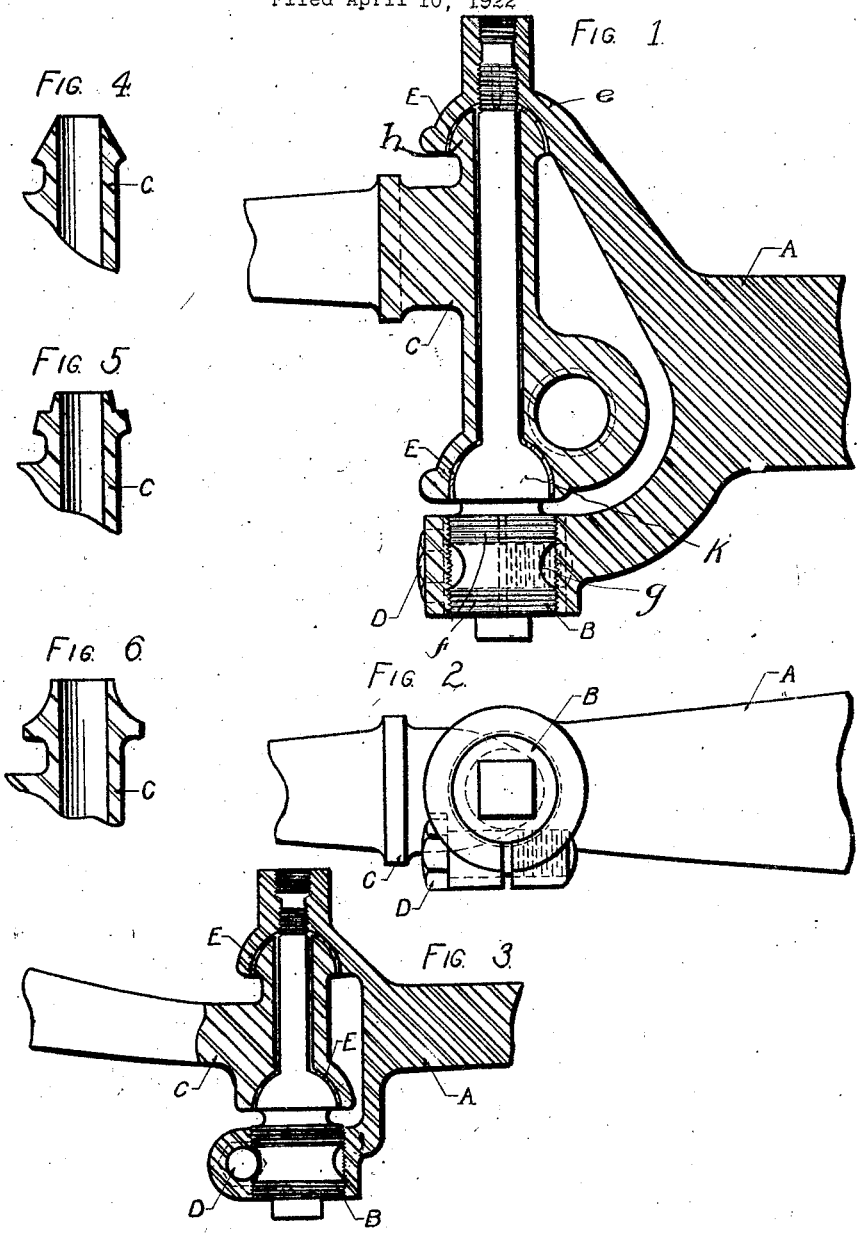

1,524,442

UNITED STATES PATENT OFFICE.

ROBERT H. LEHEW, OF DETROIT, MICHIGAN.

ADJUSTABLE BEARING.

Application filed April 10, 1922. Serial No. 551,423.

*To all whom it may concern:*

Be it known that I, ROBERT H. LEHEW, a citizen of the United States, residing at Number 2419 East Grand Boulevard, in the city of Detroit, county of Wayne, and State of Michigan, have invented certain new and useful Improvements in Adjustable Bearings, of which the following is a specification.

The invention relates particularly to adjustable bearing surfaces as applied to the steering knuckles of automobiles, or the knuckles used on the ends of the tie rods of such vehicles. As will appear hereafter, my invention is not limited to these devices, but is adaptable for use in many other forms where similar constructions are employed and in which convenient adjustments are desirable.

The ordinary knuckle or tie rod bolt construction employs an ordinary king or tie bolt the circumference of which provides the lateral bearing surface for the moving parts. These bolts become worn and frequently require replacement.

The object of my invention is to provide a construction or constructions having bearing surfaces which can be conveniently and accurately adjusted to compensate for all lateral as well as vertical wear and without the necessity of replacing parts.

The foregoing and other objects of the invention, together with means whereby the same may be carried into effect, will be best understood from the following description of certain forms or embodiments thereof shown in the accompanying drawings, in which:

Fig. 1 is a vertical section of the front steering knuckle as attached to the front axle of an automobile.

Fig. 2 is a bottom plan view of the construction shown in Fig. 1.

Fig. 3 is a vertical section of an automobile tie rod construction.

Figs. 4, 5 and 6 are vertical sections of modifications of the bearing surfaces of the knuckles shown in Figs. 1 and 3.

In Figure 1, A represents the fork or yoke on one end of the front axle of an automobile. The upper extremity or end of the yoke is provided with a vertical hole and its under side is so formed as to receive the hemispherical end $h$ of the knuckle C.

The lower end of the yoke A is constructed as shown in Figure 2 to form a clamp; said clamp being adapted to receive the threaded end of a bolt B passing through the knuckle C. Said clamp is tightened by a clamping screw D which is positioned in a groove $g$ formed in the bolt B between two threaded portions $f$ thereof. The clamping screw D secures the bolt B tightly in position, and also prevents the latter from working its way out of the yoke in the event that the clamping screw should not be sufficiently tightened or should become loosened from the vibrations brought about by the road. The bolt B is formed with a hemispherical enlargement $k$ which is received in a correspondingly shaped socket in the lower end of the knuckle C. Hemispherical bushings E are positioned in both the bearings.

It may be observed that whenever the construction here described becomes worn, suitable adjustment can be made by loosening the clamping screw D and turning the king or tie bolt B into an adjusted position. The adjustment of the bolt B forces its hemispherical portion $k$ into contact with the similarly shaped bearing surface in the lower part of the knuckle C. The upper hemispherical end $h$ of the knuckle C is consequently forced upwardly and thereafter held firmly in contact with the bearing surface of the upper portion of the yoke. After the proper adjustment is secured, the clamping bolt D is again tightened.

By means of the above described construction and arrangements of parts, the bearings are caused to wear evenly over their entire surface and all lateral as well as vertical wear can be conveniently and accurately compensated for by the single adjustment of the tie bolt without the necessity of replacing the worn parts.

Figure 3 illustrates the applicability of my invention to the smaller construction required in a parallel shaft or tie rod. The above description in connection with Figure 1, applies also to Figure 3.

Any of the modified forms in the bearing surfaces shown in Figures 4, 5 and 6 may be employed in place of the hemispherical surfaces above described, and all can be accurately adjusted in the same manner.

What I claim as new is:—

1. In combination, a supporting member having hemispherical bearing surfaces on its upper and lower sides, a bifurcated supported member with a bearing surface on its upper arm complementary to the first-mentioned bearing surface on the supporting member, and a tie bolt having a bearing surface complementary to the lower bearing surface on the supporting member.

2. In combination, a supporting member having a convex bearing surface on its upper side and a concave bearing surface on its lower side, a bifurcated supported member with a bearing surface on its upper arm complementary to the first-mentioned bearing surface on the supporting member, and a tie bolt having a bearing surface complementary to the lower bearing surface on the supporting member.

3. In combination, a supporting member having a raised bearing surface on its upper side and a second bearing surface on its lower side, a bifurcated supported member having a bearing surface on its upper arm complementary to the first-mentioned bearing surface on the supporting member, and a tie bolt having a raised bearing surface complementary to the bearing surface on the supporting member.

ROBERT H. LEHEW.